United States Patent
Beyer et al.

(10) Patent No.: US 8,117,182 B2
(45) Date of Patent: Feb. 14, 2012

(54) APPARATUS AND METHOD FOR OPTIMIZING DESCENDANT PATH EVALUATION IN XPATH/XQUERY

(75) Inventors: Kevin S. Beyer, San Jose, CA (US); Edison L. Ting, San Jose, CA (US); Tuong C. Truong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 11/738,988

(22) Filed: Apr. 23, 2007

(65) Prior Publication Data
US 2008/0263008 A1 Oct. 23, 2008

(51) Int. Cl.
*G06F 17/30* (2006.01)
(52) U.S. Cl. ........ 707/711; 707/715; 707/716; 707/737; 707/758
(58) Field of Classification Search .................. None
See application file for complete search history.

(56) References Cited

U.S. PATENT DOCUMENTS

| | | | | |
|---|---|---|---|---|
| 2002/0116371 | A1* | 8/2002 | Dodds et al. .................. 707/3 |
| 2003/0163285 | A1* | 8/2003 | Nakamura et al. ............ 702/179 |
| 2004/0193607 | A1* | 9/2004 | Kudo et al. .................. 707/9 |
| 2005/0050016 | A1 | 3/2005 | Stanoi et al. ................. 707/3 |
| 2005/0055343 | A1* | 3/2005 | Krishnamurthy ............. 707/3 |
| 2005/0065910 | A1* | 3/2005 | Welton et al. ................ 707/2 |
| 2005/0097084 | A1 | 5/2005 | Balmin et al. ................ 707/3 |
| 2006/0053122 | A1* | 3/2006 | Korn et al. ................... 707/100 |
| 2006/0106758 | A1* | 5/2006 | Chen et al. ................... 707/2 |
| 2006/0179068 | A1 | 8/2006 | Warner et al. ................ 707/100 |
| 2006/0253430 | A1 | 11/2006 | Fernandes et al. ........... 707/3 |
| 2007/0016604 | A1* | 1/2007 | Murthy et al. ............... 707/102 |
| 2007/0016605 | A1* | 1/2007 | Murthy et al. ............... 707/102 |
| 2007/0208721 | A1* | 9/2007 | Zaman et al. ................ 707/4 |
| 2008/0071733 | A1* | 3/2008 | Shadmon et al. ............ 707/2 |
| 2008/0097959 | A1* | 4/2008 | Chen et al. ................... 707/2 |

OTHER PUBLICATIONS

"BLAS: An Efficient XPath Processing System," Yi Chen et al., ACM c2004.
"BLAS: An Efficient XPath Processing System," http://webcourse.cs.technion.ac.il/236826/Spring2005/ho/WCFiles/BLAS.doc. last accessed Apr. 23, 2007.

* cited by examiner

*Primary Examiner* — Pierre Vital
*Assistant Examiner* — Mohammad S Rostami
(74) *Attorney, Agent, or Firm* — Kunzler Needham Massey & Thorpe

(57) ABSTRACT

An apparatus and method for optimizing descendant path evaluation in XPath/XQuery includes generating a list of unique paths in a tree structure of an XML document. Each unique path includes one or more nodes of the tree structure. A query is received specifying a descendant node for retrieval from the tree structure. From the list, unique paths are identified that include the descendant node. A navigation aid is then generated to assist in traversing the unique paths that include the descendant node. Using the navigation aid as a guide, descendant nodes in the tree structure may be retrieved by traversing only unique paths that include the descendant node.

2 Claims, 3 Drawing Sheets

APPARATUS AND METHOD FOR OPTIMIZING DESCENDANT PATH EVALUATION IN XPATH/XQUERY

BACKGROUND OF THE INVENTION

1. Field of the Invention

This invention relates to apparatus and methods for querying collections of XML documents, and more particularly to apparatus and methods for optimizing the evaluation of descendant paths in collections of XML documents.

2. Description of the Related Art

XQuery is a query language used to extract and manipulate data from XML documents or other data sources that can be represented as XML. The XQuery specification uses XPath expressions to address specific portions of an XML document. In general, these expressions may be written as a series of steps to travel from a current "context node" to other nodes in an XML document. A query evaluator may process the XPath expression by navigating the XML document tree and returning nodes specified in the expression.

The XQuery/XPath query language enables a user to include a descendant axis step in a query expression to return all descendant nodes of a context node. For example, the XPath query '/a//b' may be used to return all 'b' descendants of an 'a' node. The expression '//b' within the query is the step that uses the descendant axis.

Although the syntax of the '/a//b' query expression is simple, the evaluation of the query is processing intensive. In order to process this query, a query evaluator typically traverses down every child at every level of an XML document being queried, starting from an '/a' match, to find any descendant nodes of the '/a' match that match the '//b' step. If 'b' descendants only appear in a few places within an XML document (i. e., the paths leading to a 'b' node are very selective), then the query evaluator may consume many cycles traversing down sub-trees that may never lead to a '//b' match. This is true whether an XML document is stored in an in-memory representation or an XML native storage system. For this reason, it is generally advised to avoid using the descendant axis altogether and instead try to specify a node path as specifically as possible.

In view of the foregoing, what is needed is an apparatus and method for increasing the efficiency of descendant path evaluation in XPath/XQuery. Ideally, such an apparatus and method would enable a query evaluator to skip over document tree paths that lack descendants specified in an XPath expression.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide apparatus and methods for optimizing descendant path evaluation in XPath/XQuery.

In a first aspect of the invention, one embodiment of a method for optimizing descendant path evaluation in XPath/XQuery includes generating a list of unique paths in a tree structure of an XML document. Each unique path includes one or more nodes of the tree structure. The method further includes receiving a query specifying a descendant node for retrieval from the tree structure. From the list, unique paths are identified that include the descendant node. A navigation aid is then generated to assist in traversing the unique paths that include the descendant node. Using the navigation aid as a guide, descendant nodes in the tree structure may be retrieved by traversing only unique paths that include the descendant node.

In certain embodiments, traversal of unique paths that include the descendant node includes skipping evaluation of sub-trees for nodes of the XML document for which no entry exists in the navigation aid. In other embodiments, generating a list of unique paths includes generating a list of unique paths for multiple tree structures associated with a collection of XML documents. A query, in one embodiment is targeted at the collection of XML documents.

In selected embodiments, the navigation aid is a navigation table specifying nodes at each level of the tree structure that are associated with unique paths including the descendant node. In other embodiments, the navigation aid is a hash table indicating which nodes are associated with unique paths that include the descendant node.

In a second aspect of the invention, one embodiment of an apparatus for optimizing descendant path evaluation in XPath/XQuery includes a path determination module to generate a list of unique paths in a tree structure of an XML document. Each unique path includes at least one node of the tree structure. An input module is provided to receive a query in XPath/XQuery specifying a descendant node for retrieval from the tree structure. A navigation module retrieves, from the list, unique paths that include the descendant node. The navigation module then generates a navigation aid to assist in traversing the unique paths that include the descendant node. A query evaluation module retrieves, using the navigation aid as a guide, descendant nodes in the tree structure by evaluating only unique paths that include the descendant node.

The present invention provides a novel apparatus and method for optimizing descendant path evaluation in XPath/XQuery. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
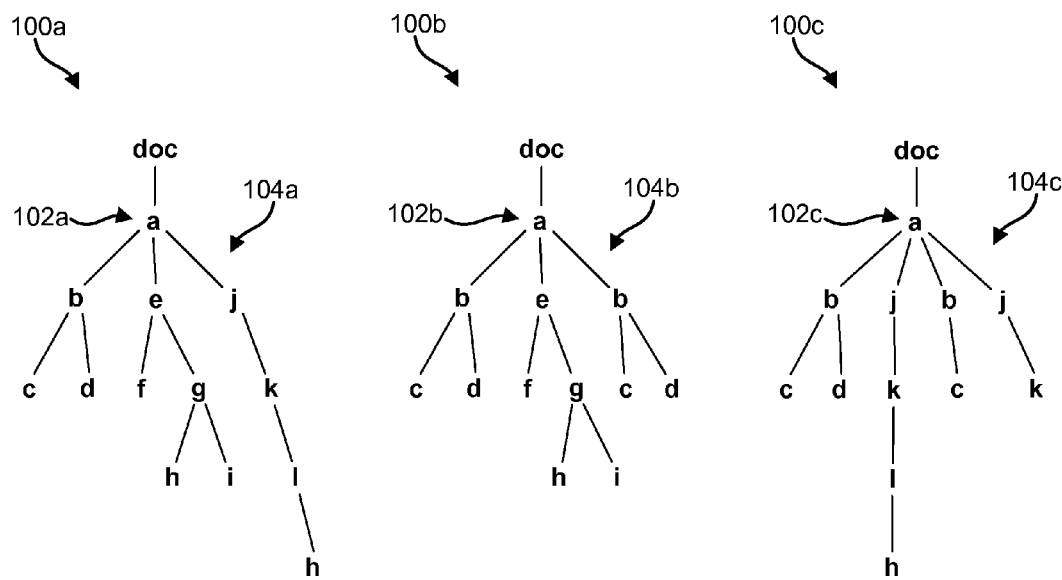
FIG. 1 is an exemplary representation of several tree structures of XML documents.

It will be readily understood that the components of the present invention, as generally described and illustrated in the Figures herein, may be arranged and designed in a wide variety of different configurations. Thus, the following more detailed description of the embodiments of the apparatus and methods of the present invention, as represented in the Figures, is not intended to limit the scope of the invention, as claimed, but is merely representative of selected embodiments of the invention.

One or more of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details are provided to provide a thorough understanding of embodiments of the invention. One skilled in the relevant art will recognize, however, that the invention may be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, tree structures 100a-c of several XML documents are illustrated. As shown, each tree structure 100a-c may include a root node 102a-c and one or more descendant nodes 104a-c beneath the root node 102a-c. A "root node" may refer not only to the top node 102a-c of a tree structure 100a-c, but also other nodes 104a-c farther down the tree structure 100a-c which may be the root for sub-trees within the tree structure 100a-c. Descendant nodes 104a-c may include child nodes at every level (i.e., children, children of children, and so forth) below the root node 102a-c.

As mentioned, the Xquery/XPath specification enables a user to specify a descendant axis step to return all descendant nodes of a "context node." The context node is the location where XPath addressing begins to arrive at other nodes in a tree structure 100a-c. For example, referring to the illustrated embodiment, an XPath query '/a//h' may be used to search for and return all 'h' descendants beneath the 'a' node, with the 'a' node being the context node.

Figure 2A:
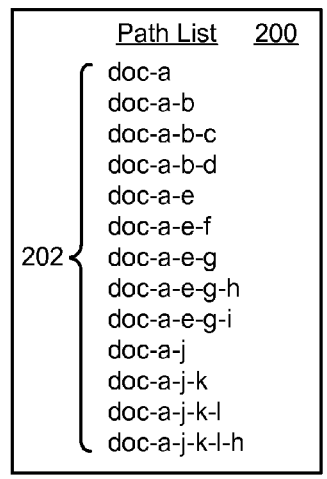
FIGS. 2A and 2B are block diagrams showing various embodiments of a list of unique paths for the XML documents illustrated in FIG. 1.

Referring to FIG. 2A, in order to speed up and optimize the evaluation of queries using descendant axis steps, a path list 200 may be created for XML documents 100a-c in a collection. The path list 200 may contain a listing of unique paths 202 through the tree structures 100a-c of the XML documents. For example, the path list 200 may include unique paths between the root nodes 102a-c and leaf nodes (e.g., doc-a-b-c, doc a-e-g-i, etc.) of each tree structure 100a-c. The path list 200 may also include unique paths between the root nodes 102a-c and non-leaf nodes (e.g., doc-a, doc a-b, doc-a-e-g, etc.) of each tree structure 100a-c. In selected embodiments, the path list 200 may be created for an XML document collection 100a-c prior to processing a query targeted at the collection 100a-c.

Figure 2B:
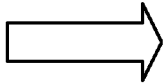
Figure 2B:
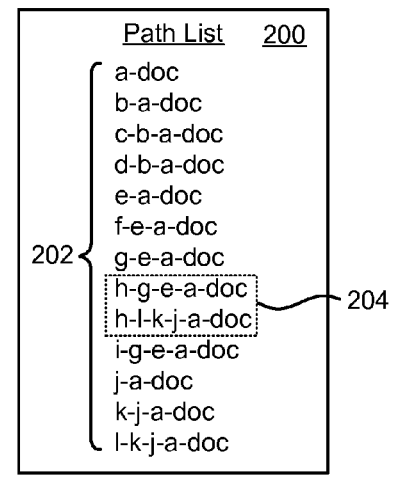

Referring to FIG. 2B, in certain embodiments, the unique paths of the path list 200 may be organized in some manner to optimize searching of the list 200, such as in reverse order or reverse alphabetical order. This allows unique paths 204 ending with same node (e.g., the 'h' node) to be listed together. As a result, paths 204 ending in 'h' may be easily located using a technique such as substring matching based on text node identifiers.

Figure 3:
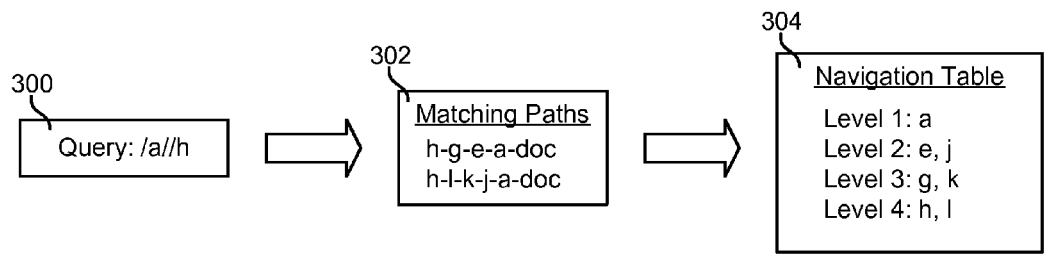
FIG. 3 is a block diagram showing one embodiment of a method to generate a navigation aid to assist in traversing XML documents to find specific descendants.

Referring to FIG. 3, upon receiving a query that includes the descendant axis step, matching paths 302 may be identified in the path list 200. For example, upon receiving a query 300 such as '/a//h', unique paths 302 terminating with an 'h' node may be located in the path list 200. In this example, the matching paths 302 would include paths doc-a-e-g-h and doc-a-j-k-l-h. After identifying matching paths 302, a navigation aid 304, such as a navigation table 304, is created from the matching paths 302 to assist in evaluating the collection of XML documents 100a-c in a more optimal manner.

In selected embodiments, a navigation table 304 includes hints as to which nodes at each level of a document tree 100a-c may lead to the descendant nodes sought after. For example, referring again to matching paths doc-a-e-g-h and doc-a-j-k-l-h corresponding to the '/a//h' query, the navigation table may include the node 'a' at level 1, 'e' and 'j' at level two, 'g' and 'k' at level three, and 'h' and 'l' at level 4. A query evaluator may use this information to successfully evaluate the collection of XML documents 100a-c without traversing paths that include sub-trees lacking the 'h' descendant node.

Figure 4:
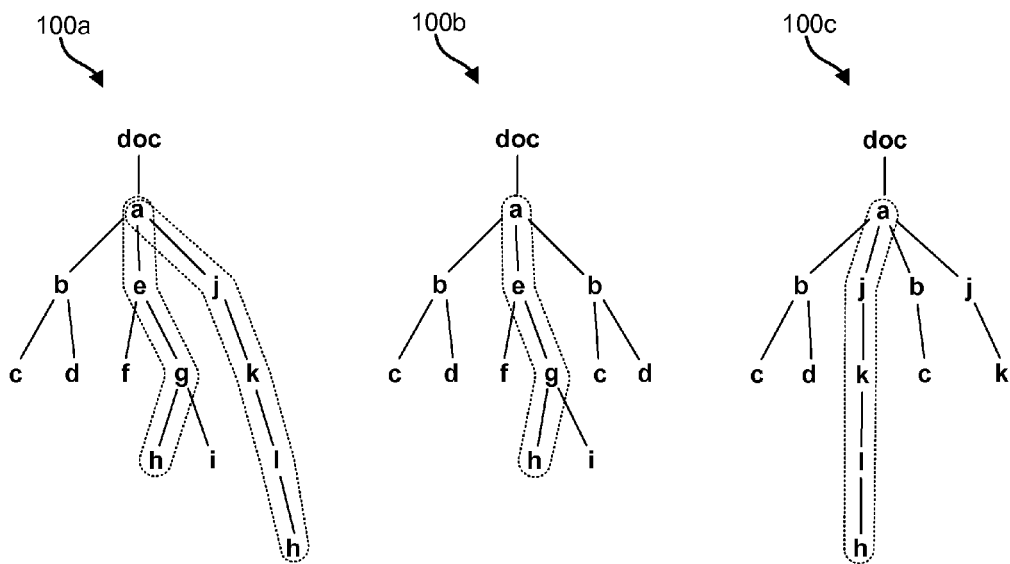
FIG. 4 is a representation of the tree structures of FIG. 1 showing the traversal of unique paths including specific descendants.

Referring to FIG. 4, using the navigation table 304 as a guide, a query evaluator may traverse the tree structures 100a-c from top to bottom to find matching descendants. Once the query evaluator encounters a first document node 'a' that matches the '/a' step, the query evaluator may then examine the list of children under the 'a' node. For example, the document 100a includes children 'b', 'e', and 'j' under the 'a' node. Using the navigation table 304, the query evaluator determines that at level 2, only the 'e' and 'j' children and associated sub-trees need to be evaluated for the documents 100a-c. Thus, the query evaluator may skip traversal of the 'b' sub-trees in the documents 100*a-c*. At level 3, the query evaluator may evaluate the 'g' and 'k' sub-trees while skipping traversal of the other children and sub-trees. This process continues for each level in the document trees 100*a-c*. In short, for each level of an XML document 100*a-c*, the query evaluator traverses sub-trees for nodes that are listed in the navigation aid 304, while skipping the sub-trees of nodes not listed in the navigation aid 304. The dotted lines in FIG. 4 indicate the paths the query evaluator takes traversing the documents 100*a-c* with the assistance of the navigation table 304.

In other embodiments, a query evaluator may employ a hash function in place of the navigation table 304 described in association with FIG. 3. For example, a query evaluator may perform a hash table lookup of Hash (e, 2) to determine whether the sub-tree rooted at the 'e' node of level two includes 'h' nodes as descendants. If the output of the hash function indicates that the node has 'h' node descendants, then the query evaluator will evaluate the sub-tree under the 'e' node at level two. This same process may be performed for other nodes as the query evaluator traverses the tree structures 100*a-c*. Such a hash function would be useful to reduce the cost of lookups.

Nevertheless, it should be noted that embodiments of the present invention only provide hints to the query evaluator and may occasionally return false positives, particularly where nodes on one level of a document coincidentally have the same identifier. For example, the third document 100*c* includes a doc-a-j-k path that does not lead to an 'h' node and the query evaluator may be unable to avoid the path using the hash function.

Figure 5:
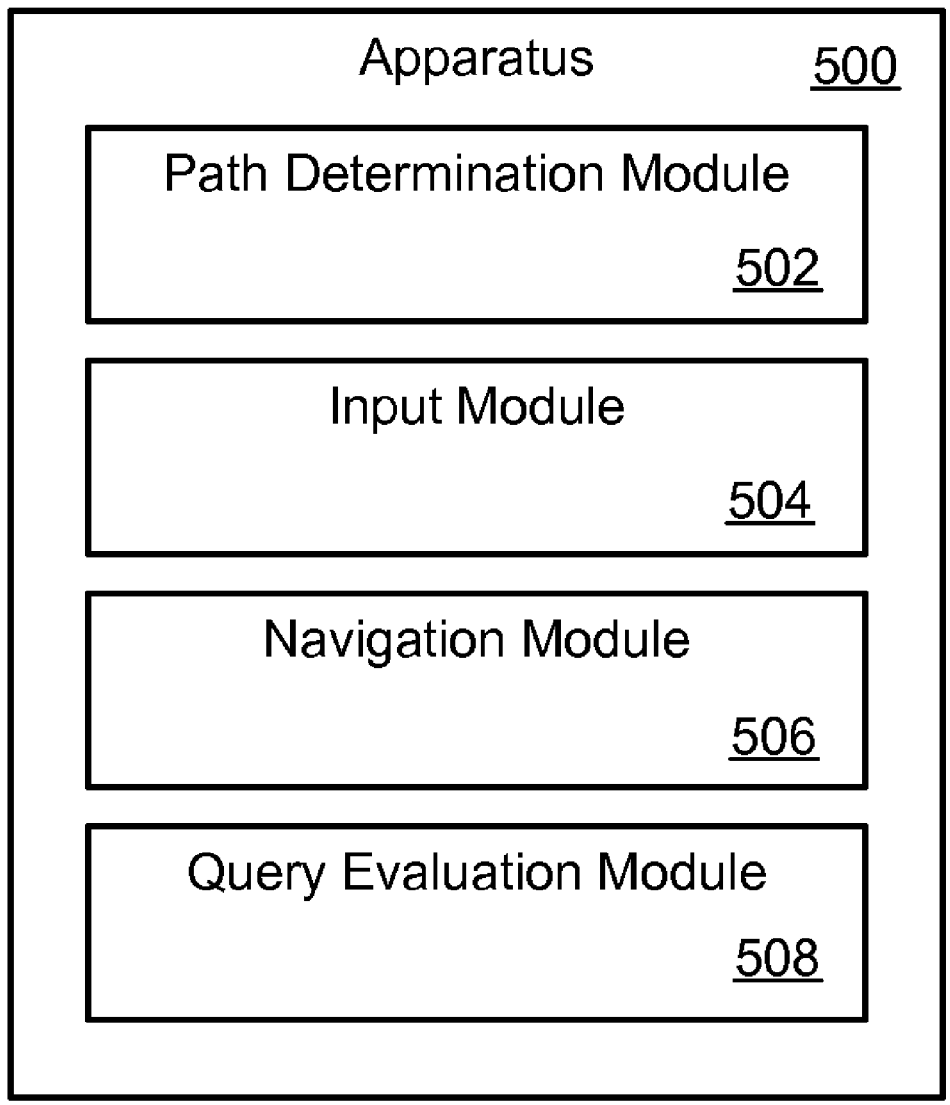
FIG. 5 is a block diagram showing one embodiment of an apparatus for optimizing descendant path evaluation in accordance with the invention.

Referring to FIG. 5, one embodiment of an apparatus 500 suitable for optimizing descendant path evaluation may include a path determination module 502, an input module 504, a navigation module 506, and a query evaluation module 508. Such an apparatus 500 may be implemented in hardware, software, or a combination thereof.

In selected embodiments, a path determination module 502 may be used to generate a path list 200 for one or more XML documents in a collection. Such a path list 200 may list the unique paths through the document tree structures of the collection. As mentioned, in certain embodiments, the path determination module 502 may generate a path list 200 prior to processing queries. In certain embodiments, the path determination module 502 may be configured to organize the unique paths in the path list 200 to aid in locating matching paths.

An input module 504 may be used to receive a query specifying a descendant node for retrieval from the tree structure. A navigation module 506 may be provided to identify unique paths in the path list 200 that match the descendant specified in the query. After identifying matching paths 302, the navigation module may generate a navigation aid 304, such as navigation table 304 or hash table as described above, to assist in evaluating one or more XML documents.

Using the navigation aid 304 as a guide, a query evaluation module 508 may traverse the tree structure 100*a-c* of one or more XML documents to find matching descendants. This includes traversing sub-trees where the navigation aid 304 indicates that a descendant may be located and skipping sub-trees where a descendant is unlikely to be located.

Benefits provided by the apparatus 500 include substantial savings in traversal time of collections of XML documents. Because a navigation aid 304 may be created for a collection of documents, as opposed to documents individually, the cost of building such a structure may be offset by the savings in query evaluation time applied to multiple documents within a collection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for optimizing descendant path evaluation in XPath/XQuery, the method comprising:

generating a list of unique paths from a plurality of tree structures for a collection of Extensible Markup Language ("XML") documents prior to receiving queries targeted at the XML documents in the collection of XML documents, each unique path comprising a distinct route through a tree structure of a particular XML document from one or more root nodes to one or more non-root nodes, the tree structure comprising one or more hierarchical levels of nodes;

ordering the unique paths in the list in reverse path order to optimize searching of the list;

receiving a query in XPath/XQuery format targeted toward the collection of XML documents, the query specifying a descendant node for retrieval from a tree structure of the plurality of tree structures;

identifying, from the list, each unique path that include the descendant node specified by the query;

generating a navigation aid for the query, the navigation aid comprising a hash table of all nodes with a same identifier as an identifier of a first node in a first path that comprises the descendent node specified by the query, wherein the identifier is not unique and paths of the nodes of the hash table are not known to include the descendent node specified by the query and are not known to include the first path such that the hash table includes false positives of the descendent node;

performing a hash table lookup of the hash table at each hierarchical level in the tree structure to determine sub-trees with a node comprising the identifier, the hash table lookup using a hierarchical level identifier and a sub-tree identifier;

evaluating, at each hierarchical level in the tree structure, sub-trees with the node comprising the identifier;

skipping, at each hierarchical level in the tree structure, evaluation of sub-trees of the XML document for a node of each hierarchical level in the tree structure for which no entry exists in the navigation aid as determined by the hash table lookup; and retrieving, using the navigation aid, descendant nodes in the tree structure by traversing only the sub-trees that include the descendant node.

2. An apparatus for optimizing descendant path evaluation in XPath/XQuery, the apparatus comprising:

a storage device storing executable code;

a processor executing the executable code, the executable code comprising:

a path determination module to generate a list of unique paths from a plurality of tree structures for a collection of Extensible Markup Language ("XML") documents prior to receiving queries targeted at the XML documents in the collection of XML documents, each unique path comprising a distinct route through a tree structure of a particular XML document from one or more root nodes to one or more non-root nodes, the tree structure comprising one or more hierarchical levels of nodes, the path determination module to order the unique paths in the list in reverse path order to optimize searching of the list, the path determination module stored on a memory and executed by a processor;

an input module to receive a query in XPath/XQuery format targeted toward the collection of XML documents, the query specifying a descendant node for retrieval from a tree structure of the plurality of tree structures;

a navigation module to generate, from the list, a hash table of all nodes with a same identifier as an identifier of a first node in a first path that comprises the descendent node specified by the query, wherein the identifier is not unique and paths of the nodes of the hash table are not known to include the descendent node specified by the query and are not known to include the first path such that the hash table includes false positives of the descendent node; and a query evaluation module to perform a hash table lookup of the hash table, at each hierarchical level in the tree structure, to determine sub-trees with a node comprising the identifier, the hash table lookup performed with a hierarchical level identifier and a sub-tree identifier, the query evaluation module to evaluate, at each hierarchical level in the tree structure, the sub-trees with the node comprising the identifier, to skip, at each hierarchical level in the tree structure, evaluation of sub-trees of the XML document for a node of each hierarchical level in the tree structure for which no entry exists in the navigation aid as determined by the hash table lookup, and to retrieve, using the navigation aid, descendant nodes in the tree structure by evaluating only the sub-trees with the node comprising the identifier.

* * * * *